United States Patent [19]

McCorriston

[11] Patent Number: 4,536,374

[45] Date of Patent: Aug. 20, 1985

[54] PROCESS USING CARBONATE REAGENT FOR RECOVERING VANADIUM FROM COKES AND ASHES DERIVED FROM HEAVY OILS

[75] Inventor: Lois L. McCorriston, Mississauga, Canada

[73] Assignee: Gulf Canada Limited, Toronto, Canada

[21] Appl. No.: 608,313

[22] Filed: May 8, 1984

Related U.S. Application Data

[60] Division of Ser. No. 516,629, Jul. 25, 1983, Pat. No. 4,472,360, which is a continuation-in-part of Ser. No. 334,103, Dec. 24, 1981, abandoned, which is a continuation of Ser. No. 198,501, Oct. 20, 1980, abandoned.

[51] Int. Cl.$^3$ .............................................. C01G 31/00
[52] U.S. Cl. ........................................ 423/68; 423/62
[58] Field of Search ...................... 423/68, 62; 75/121

[56] References Cited

U.S. PATENT DOCUMENTS

| | | | |
|---|---|---|---|
| 2,187,750 | 1/1940 | Marvin | 423/62 |
| 3,792,150 | 2/1974 | Maxwell et al. | 423/62 |
| 4,087,510 | 5/1978 | Steenken | 423/62 |
| 4,243,639 | 1/1981 | Haas et al. | 423/68 |
| 4,389,378 | 6/1983 | McCorriston | 423/68 |

FOREIGN PATENT DOCUMENTS 1331932   9/1973   United Kingdom ................ 423/62

*Primary Examiner*—H. T. Carter
*Attorney, Agent, or Firm*—R. H. Saunders

[57] ABSTRACT

Vanadium values are recovered from sulphur-containing cokes and ashes derived from heavy oils by a novel process comprising heating in the presence of alkali metal carbonate, contacting the resulting solid residue with water to form a leach and recovering the vanadium values dissolved therein. The heating step solubilizes only alkali metal vanadate and thus the leach solution is substantially free of contaminating substances.

9 Claims, No Drawings

PROCESS USING CARBONATE REAGENT FOR RECOVERING VANADIUM FROM COKES AND ASHES DERIVED FROM HEAVY OILS

This application is a division of application Ser. No. 06/516,629, filed July 25, 1983, now U.S. Pat. No. 4,472,360, which is a continuation-in-part of Ser. No. 334,103, filed Dec. 24, 1981, which is a continuation of Ser. No. 198,501, filed Oct. 20, 1980, the last two being now abandoned.

FIELD OF THE INVENTION

This invention relates to the recovery of vanadium from materials derived in the processing of heavy oils and bitumens wherein coke may be a by-product. More specifically, it relates to the recovery of vanadium from materials that may contain elemental carbon and other impurities along with the vanadium compounds by means of heating in the presence of air and certain inorganic salts which convert the vanadium values into compounds that are water-soluble and can therefore be easily separated and readily purified.

BACKGROUND

In the processing of heavy crude petroleums, oil sands, and similar raw materials, a common approach to the problem of their low hydrogen-to-carbon ratio is to diminish their carbon content by various types of coking processes. Generally in these processes a large amount of predominantly carbonaceous material (coke) is formed, whose high heating value makes it useful for process heating in the extraction plants. In the Flexicoking (Trade Mark) fluid coking process in which most of the coke is gasified after passing through the fluid coker, smaller amounts of coke are produced per unit of crude petroleum or other feed and consequently the ash and vanadium content of the coke from such process is higher than that of coke from other coking processes. Fly ash, a by-product of conventional combustion of petroleum coke, is not entirely free of carbonaceous materials and generally contains about 50 percent ash and 50 percent coke granules, depending upon the particular combustion process and the feedstock. The aforementioned ash portion of the coke and fly ash materials contains substantially all of the metallic minerals from the original heavy crudes, including the vanadium which occurs in heavy crudes in the form of porphyrins. The coke may also contain nickel compounds, and less valuable materials such as aluminosilicates and other inorganic compounds that may be carried over with the bitumen in the separation processes that are commonly employed in extracting bitumen from sand in mineable oil sands deposits. Some of the metallic constituents, particularly the vanadium and the nickel, have significant commercial value. Furthermore, if the metallic materials are deposited as tailings at plant sites or elsewhere, they are subject to leaching by rain and can cause contamination of ground water supplies, a potentially significant environmental hazard. It is therefore desirable to separate the commercially valuable materials and to render the residue as harmless as possible.

A known method for recovering metals contained in the residua from the distillation of heavy hydrocarbons is direct leaching of by-product fly ash. Acidic and alkaline solutions as well as water have been utilized as the leach solvent, but generally these methods exhibit poor yield of vanadium values and do not adequately separate the vanadium from any contaminants that may be present. As the acidity of the leach solvent increases, the yield of recovered metal usually increases, but the improvement is usually obtained at the cost of greater carryover of impurities, to the point where if 2-Normal sulphuric acid is employed, many of the components in the fly ash appear in the overflow solution and there remains the problems of separating a complex mixture, except that it is in the liquid (solution) phase.

Stemerowicz et al (Canadian Institute of Mining and Metallurgy Bulletin, April 1976, pp. 102–108) disclosed separation of a mineral-rich portion from a fly ash by-product of Suncor, Inc. at Fort McMurray, Alberta by flotation or alternatively, by combustive roasting of the coke to leave a mineral-rich portion as ash, and smelting of the mineral-rich fraction to obtain ferro-vanadium or metal alloys containing the vanadium along with other metals such as iron and silicon, in the elemental state. Losses of vanadium to the slag were 14 percent in the first stage and 20 percent to 58 percent in the second stage, and the product required further treatment to purify the vanadium.

In Vesely's patent, U.S. Pat. No. 3,522,001, a process was disclosed comprising mixing alkali metal halide with coke and burning the mixture "at temperatures sufficiently high to fuse the metals and the salt", scrubbing the fused residue with a weak solution of sulphurous acid, forming a sulphurous acid solution of nickel ions and slurry containing alkali metal vanadate, separating and recovering vanadium pentoxide from the slurry and performing three other steps to recover nickel oxide. No percentage yield of vanadium or purity of the product was disclosed in that patent.

As early as 1906, Handy (U.S. Pat. No. 831,280) disclosed the roasting of ores with any of several alkali salts, followed by water leaching. Although no temperature conditions were taught in the patent, it is clear that the process was operated well above the point of fusion of the salts because it was noted that alumina and silica were solubilized, an effect that occurs only substantially above the fusion point of the salt and in the presence of a large excess of salt.

The Handy patent asserted a need to remove sulphur prior to fusion of the ore with the salt. However, this approach unnecessarily consumes reagent; it has been found that high sulphur content of the raw material, measured as high as 12 percent, does not affect recovery of the vanadium in the present invention. Furthermore, the presence of calcium is stated in the art (Lundquist, U.S. Pat. No. 2,640,754) to impede vanadium recovery from certain ores; however, it has been found that, in the process disclosed herein and without prior treatment with concentrated sulphuric acid, a high recovery can be obtained regardless of calcium (reported as Ca) in the raw material in a proportion up to at least 4.6 percent.

Prior art processes in general exhibit poor yields, high chemical consumption, and/or low specificity when applied to cokes and ashes derived from oil sands bitumen. Indeed, in a paper entitled "Potential for Recovering Vanadium from Athabasca Tar Sands", presented at the 26th Canadian Chemical Engineering Conference, Toronto, Oct. 3–6, 1976, L. A. Walker, R. W. Luhning and K. Rashid concluded, after tests which consumed excessive amounts of chemicals while yielding a maximum of 35 percent vanadium recovery, that "There is at the moment no economically feasible commercial recovery method."

In the following disclosure and claims, "alkali metal vanadate" comprehends both metavanadate, $MVO_3$, and pyrovanadate, $M_4V_2O_7$. All parts, proportions and percentages in the disclosure and claims are by weight unless specifically indicated otherwise.

PROCESS OF THE INVENTION

The present invention is a process for the recovery of vanadium from a sulphur-containing material of the group consisting of coke derived from hydrocarbonaceous oil, and ash obtained from said coke, wherein said hydrocarbonaceous oil is heavy oil, in-situ oil sands bitumen or mineable oil sands bitumen, comprising:

(a) mixing the material with an alkali metal carbonate reagent in a finely divided form, (b) heating the mixture in the presence of an oxidizing atmosphere at an elevated temperature below the fusion point of the reagent, (c) contacting the resulting solid residue with water to form a leach solution, and (d) recovering the vanadium values from the leach solution, the amount of said alkali metal carbonate being at least sufficient to convert the vanadium values present in said material into alkali metal vanadate and insufficient to cause the substantial carryover of said alkali metal carbonate into said leach solution.

The present invention is adaptable to raw materials derived from any of the well-known types of coking processes, for example, a delayed coker or fluid coker. It can be either coke produced by such process or the fly ash recovered from combustion of the coke. The raw material can originate from in-situ oil sands, mineable oil sands, in-situ heavy oil or other sources of crude hydrocarbons. It can contain appreciable amounts of sulphur, which does not inhibit the present process or consume significant amounts of reagent. In contrast to known prior art processes, where the raw material contains no vitrified substances the present process uses less reagent in the mixture to be heated than is required to react with the vanadium values present in the raw material to form alkali metal metavanadate and also to react with the sulphur values present in heavy oils, bitumens and cokes and ashes derived therefrom. The amount sufficient to react with vanadium is hereinafter called the vanadium stoichiometric amount. The amount sufficient to react with both vanadium and sulphur values is hereinafter called the combined stoichiometric amount; the latter of course always exceeds the vanadium stoichiometric amount. The amount of reagent supplied when the raw material is not partially vitrified is at least the vanadium stoichiometric amount, but preferably less than would be required in addition to react with 75 percent of the sulphur, and more preferably less than the amount that would be required to react with 50 percent of the sulphur. The raw material, which is normally in finely divided form, is mixed with an alkali metal carbonate, preferably sodium carbonate. The cation, sodium, is usually interchangeable with other alkali metals and is selected in the present process because sodium compounds are relatively inexpensive compared to those of other alkali metals. The raw material-to-reagent ratio in the mixture is adjusted so that the reagent is present in an amount at least equal to the stoichiometric amount necessary to convert the vanadium values in the raw material into alkali metal metavanadate, and preferably at least 10 percent in excess of said stoichiometric amount. The excess of reagent over the stoichiometric quantity can be minimized by agitating the mixture during the heating step; a higher excess is preferred for optimum recovery of vanadium from ashes that have been partially vitrified as in a high-temperature combustion; excesses up to 30 times the stoichiometric amount may be required to free the vanadium values from the vitrified portions of the raw material, and in general, the amount of reagent used is at least ten times and preferably fifteen times the vanadium stoichiometric amount; for a typical highly vitrified fly ash containing 1.5 percent vanadium (reported as V) and 2.5 percent sulphur (reported as S), such an amount is about twice, and preferably three times, the combined stoichiometric amount. In a low-sulphur fly ash, the effective amount of reagent is generally at least two times and up to 20 times the combined stoichiometric amount. Where the raw material contains substantially no vitrified components the reagent is supplied in lesser amount than the combined stoichiometric amount. Contrary to the known prior art processes, the present process gives a high recovery of vanadium values without supplying enough reagent to react with the sulphur present in the raw material. Further, it does not substantially solubilize sulphur compounds even while providing sufficient reagent to react with some portion of the sulphur values. Preferably, the amount of reagent is less than the amount that would be required if it were to react with the vanadium and 75 percent of the sulphur, and more preferably, less than the amount that would be required if it were to react with the vanadium and 50 percent of the sulphur. In raw materials containing sulphur:vanadium ratios of at least 4:1, for example coke manufactured by Suncor, Inc. from Athabasca oil sands bitumen which has a sulphur content about 80 times its vanadium content, reagent is preferably added in amounts less than the amount that would be required if it were to react with the vanadium and 10 percent of the sulphur. The reagent can include water of hydration; it is preferred, however, that the reagent be anhydrous. No added water is utilized in the heating step.

The mixture is heated under controlled conditions such that the temperature does not rise far enough to cause fusion of the reagent. It has been discovered that, contrary to the teachings in the art, fusion is not only unnecessary but also undesirable, in that fusion lowers the yield of valuable metal, and can also cause increased consumption of reagent. Thus for sodium carbonate, for example, the maximum temperature that the mixture should reach during heating is about 850° C. The heating is done in the presence of an oxidizing atmosphere in order to utilize, for heating of the mixture, part or all of the heat of combustion of any coke that may be present. The minimum useful temperature in the heating step is approximately 500° C., because the reaction rate is impracticably slow below that temperature. Where the raw material contains primarily carbon, the minimum temperature is about 760° C. in order to burn off the coke to permit improved contact between raw material and reagent. Where the raw material contains sufficient coke to sustain combustion, temperature control can be maintained by any or all of several means, for example, controlling air inflow to the combustion chamber, controlling inflow of the rection mixture or removing heat by providing a means for heat transfer or by dilution with non-oxidizing gases, for example carbon dioxide. If, because of low coke content relative to the inorganic material, the combustion proceeds too slowly to maintain an adequate temperature for the formation of alkali metal vanadates, additional heat may be introduced or generated by appropriate means. The residence time of the mixture of raw material and alkali metal carbonate in the heating step is about 0.2 to 5 hours. After heating, the solid material contains the desirable vanadates as well as other materials including nickel compounds, silicates, alumina and other clay-like substances. The solid material is then contacted (leached) with water in order to dissolve the vanadates. It is preferred that the water be at a temperature in the range 60° C. to 100° C., to obtain a rapid solution rate, but because the vanadates produced are adequately soluble also in cold water, it is not mandatory that the water be hot. The water containing the dissolved vanadate is separated from the solid residue and the vanadate is recovered by known methods from the vanadate solution. A useful method is the addition of ammonia, which causes the precipitation of ammonium vanadate ($NH_4VO_3$), which in turn can be readily converted into the pentoxide or other desired form of vanadium. The solid material not dissolved by the leach water can then be treated for separation of the nickel values contained therein.

It has also been discovered, contrary to the teachings in the art, that the presence of calcium, aluminum, silicon, iron and nickel in the raw material does not hinder the specificity of the vanadium extraction by the process of this invention, as illustrated in the Examples hereinafter described. From the ash derived from heavy oils of the Cold Lake or Wabasca, Alberta deposits and from coke made by fluid coker and delayed coker operations using Athabasca tar sands bitumen, the only water-soluble material produced by the process is the sodium vanadate. Depending upon the raw material, up to 2900 percent excess of reagent over the stoichiometric level does not produce other soluble materials, provided that the temperature is maintained below the fusion point of the reagent.

The probable reaction mechanism during the heating process is that sodium metavanadate ($NaVO_3$) is formed first. In a slower reaction, pyrovanadate ($Na_4V_2O_7$) is formed when the metavanadate itself reacts with $NA_2CO_3$. Therefore the amount of reagent consumed is slightly more than that which would stoichiometrically react to form metavanadate, and the exact amount required for any given raw material is not accurately predictable. Whenever a stoichiometric amount is specified in this disclosure and claims, it is based upon the reaction to metavanadate, $NaVO_3$. Where a stoichiometric quantity necessary to react with sulphur is specified, it is based on one mole of alkali metal carbonate reacting with one mole of sulphur.

The leaching solvent in the instant invention is water. Because the heating step renders the vanadium values water-soluble, strong leaching agents such as acids and bases are avoided, with the result that constituents other than the vanadate are not attacked and brought into the overflow solution. This provision assists markedly in maintaining the selectivity of the vanadium recovery, and significantly reduces potential environmental impact.

In the heating step sodium carbonate forms carbon monoxide or carbon dioxide upon reacting with tetravalent or pentavalent vanadium compounds, respectively. An advantage of using the carbonate over the chloride is that these effluent gases have much less impact on the environment than hydrogen chloride and chlorine produced during heating with chloride, and less expenditure is needed to clean up the effluent gases from the heating step. Because of their lower corrosivity, also, the heating equipment can be fabricated from less resistant, hence less expensive, alloys than equipment in which highly corrosive hydrogen chloride and chlorine are present.

The advantages of using the present process are several, of which the high yield of vanadium and the specificity are the most important. Thus the process permits the production of highly purified vanadium values uncontaminated by other elements that may be present in the raw materials, for example nickel, iron or silicon. Another advantage is that the reagent used is an inexpensive and readily available salt. A further advantage of the utilization of sodium carbonate is that virtually no pollutants are added to the combustion gases besides the relatively innocuous carbon dioxide formed during the reaction of the carbonate with the raw material. Another advantage over many prior art processes of the embodiment using coke as raw material is that the solubilization of the vanadium values is carried out in the same step as combustion of the coke, and thus the purchase of separate equipment for burning coke and roasting the resulting fly ash is avoided. A further advantage is the elimination of most if not all of the leachable materials from the tailings. Because soluble nickel compounds are not formed from the raw materials used in this process, the filtered residue contains substantially all the nickel from the coke or ash, and a still further advantage is thus the production of tailings with a nickel concentration higher than that of many Canadian ore deposits, making them valuable for further processing to obtain nickel values.

The process of the invention can be carried out as shown in the Examples, which describe preferred embodiments of the process.

EXAMPLES 1-4

Samples of by-product fly ash manufactured by Suncor, Inc. from Athabasca oil sands bitumen were blended with sodium carbonate containing 2.1 percent moisture in the ratios noted in Table 1. The fly ash contained 1.33 percent vanadium (reported as V) and 2.25 percent sulphur (reported as S); the quantities of reagent compared to the vanadium stoichiometric amount and compared to the combined stoichiometric amount are shown in the Table. The ash comprised carbon particles and vitrified spheres, each about 50 percent by weight of the total sample. The blends of Example 1 and comparison runs C1 and C2 were placed in crucibles and heated for two hours in a muffle oven at the noted temperatures, and manually agitated once after one hour. Other blends were heated at constant temperature (specified in Table 1) for a period of 2 hours in a constantly rotated quartz tube having an expanded centre section usable as a sample chamber. Into one end of the tube a uniform flow of preheated air was introduced in order to maintain an oxidizing atmosphere. After the heating period, the remaining solid material was removed from the furnace and contacted with water at a temperature of about 80° C. for three hours. After being filtered, the overflow solutions were diluted in volumetric flasks and the content of vanadium and possible contaminating elements analysed. Table 1 shows the effect of several factors upon the yield of vanadium and contamination in the overflow solution. The maximum recovery achieved was 88.0 percent using sodium carbonate as the reagent and a processing temperature more than 90° below its melting point. A conventional process, illustrated by the 900° C. test, yields significantly less vanadium than the process of the invention. By way of comparison, sodium chloride reagent in the same process at 790° C. yielded only 50 to 60 percent of the vanadium. The leach solutions showed very small amounts of contamination, particularly of aluminum. Such a result is unexpected in view of the Steenken patent, U.S. Pat. No. 4,087,510, which disclosed that large amounts of aluminum dissolve in the leach water when reagent quantities more than about 20 percent in excess of the combined stoichiometric amount are used. But, with Steenken's ratio of salt to vanadium and sulfur, only 17.2% recovery is achieved (C3).

TABLE 1

RECOVERY OF VANADIUM FROM SUNCOR FLY ASH

| Example or Comparison | 1 | 2 | 3 | 4 | C1 | C2 | C3 |
|---|---|---|---|---|---|---|---|
| Temp., Deg. C. | 790 | 760 | 760 | 760 | 900 | 760 | 760 |
| Times Stoichiometric on Vanadium | 28.3 | 28.3 | 21.2 | 14.2 | 28.3 | 0 | 7.08 |
| Times Stoichiometric on Vanadium & Sulphur | 4.44 | 4.44 | 3.33 | 2.22 | 4.44 | 0 | 1.11 |
| Raw Material/Salt Ratio | 10:4 | 10:4 | 10:3 | 10:2 | 10:4 | 10:0 | 10:1 |
| Vanadium Recovery (%) | 79.1 | 88.0 | 63.4 | 24.7 | 63.6 | — | 17.2 |
| Contamination of Leach Solution, p.p.m. | | | | | | | |
| Ca | <0.2 | <0.2 | 1.1 | 4.2 | 0.2 | 16.4 | 4.9 |
| Al | 3.0 | <1.0 | 5.5 | <1.0 | <1.0 | 1.6 | <1.0 |
| Si | 6.0 | 5.0 | 9.0 | 4.7 | 30 | 0.7 | 7.9 |
| Fe | <0.2 | <0.2 | 0.2 | <0.2 | <0.2 | <0.2 | <0.2 |
| Ni | <0.2 | <0.2 | <0.2 | 0.4 | <0.2 | <0.2 | <0.2 |

TABLE 2

VANADIUM RECOVERY FROM SUNCOR COKE

| Example or Comparison | 5 | 6 | C4 | C5 | C6 |
|---|---|---|---|---|---|
| Temp., Deg. C | 800 | 800 | 800 | 900 | 800 |
| Times Stoichiometric on Vanadium | 102.5 | 20.5 | 205.0 | 20.5 | 0 |
| Times Stoichiometric on Vanadium & Sulphur | 0.403 | 0.0806 | 0.806 | 0.0806 | 0 |
| Raw Material/Salt Ratio | 10:1 | 10:0.2 | 10:2 | 10:0.2 | 10:0 |
| Vanadium Recovery (%) | 91.0 | 96.2 | 84.7 | 36.6 | — |
| Sulphur Recovery | 34.0 | 2.3 | 52.3 | 0.2 | 0.1 |
| Contamination of Leach Solution, p.p.m. | | | | | |
| Ca | 3.0 | 0.5 | <0.1 | * | 0.2 |
| Al | <1.0 | 1.7 | <1.0 | * | <1.0 |
| Si | 2.8 | 4.5 | 73 | * | <1.0 |
| Fe | <0.2 | <0.2 | 1.0 | * | <0.2 |
| Ni | <0.2 | <0.2 | <0.2 | * | <0.2 |

*insufficient sample

EXAMPLES 5 AND 6

Samples of a delayed coker coke material manufactured by Suncor, Inc. from Athabasca oil sands bitumen were mixed with sodium carbonate in the weight ratios noted in Table 2. The sulphur content of the coke was 7.32 percent and the vanadium content was 0.0919 percent, the reagent thus being present at 20.5 times the stoichiometric level with respect to vanadium and 0.0806 times the stoichiometric level with respect to vanadium plus sulphur in Example 6. The mixtures were heated at the specified temperature for a period of 2 hours in the rotating sample cell described above. The samples were contacted with water and analysed as described above. It can be seen from Table 2 that the yield of vanadium from delayed coker coke is consistent with the yield from fly ash in that in Run C5 a temperature above the salt's fusion point does not bring about increased yields. A yield in the leach solution of 96.2 percent of the vanadium contained in the sample was achieved, despite the presence of 4.6 percent calcium (reported as Ca) in the inorganic portion of the coke sample. It is noted that at reagent ratios of less than 75 percent of the combined stoichiometric amount, the recovery of vanadium in the leach solution was high, in contrast to the processes shown in the art which disclose that sufficient reagent must be provided to convert both the vanadium and the sulphur values present in the raw material.

EXAMPLES 7 AND 8

Samples of coke manufactured by Syncrude Canada Ltd. from Athabasca oil sands bitumen were ashed at 540° C. The ash obtained was blended with sodium carbonate in the ratios noted in Table 3. The ashed bitumen contained 2.06 percent vanadium and 3.29 percent sulphur. Thus there was present 9.1 times the stoichiometric amount of reagent with respect to vanadium and 1.50 times the combined stoichiometric amount in Example 7. The blends were heated in a muffle oven at the noted temperatures for two hours; after one hour, the samples were shaken manually to remix the blends. The samples were then leached and analysed as described in Example 1.

From Table 3 it can be seen that the contamination by all listed contaminants is very small when the process of the invention is used (Examples 7 and 8). Much less sulphate is recovered than is present in soluble form in the original raw material (Run C8), indicating that the use of a carbonate ratio in the appropriate range causes sulphur to be converted to an insoluble form (Run C7).

TABLE 3

VANADIUM RECOVERY FROM SYNCRUDE COKE ASH

| Example or Comparison | 7 | 8 | C7 | C8 |
|---|---|---|---|---|
| Temp., Deg. C. | 822 | 822 | 822 | — |
| Times Stoichiometric on Vanadium | 4.57 | 2.28 | 9.14 | (direct leach) |
| Times Stoichiometric on Vanadium & Sulphur | 0.752 | 0.376 | 1.504 | (direct leach) |
| Raw Material/Salt Ratio | 10:1 | 10:0.5 | 10:2 | 10:2 |
| Vanadium Recovery (%) | 76.4 | 76.9 | 85.6 | — |
| Sulphur Recovery (%) | 12.4 | 5.4 | 17.3 | 90.5 |
| Contamination of Leach Solution, p.p.m. | | | | |
| Ca | 0.8 | 0.7 | 3.2 | 40 |
| Al | 1.2 | <1.0 | <1.0 | <1.0 |
| Si | <1.0 | <1.0 | 3.2 | 4.2 |
| Fe | <0.2 | <0.2 | <0.2 | <0.2 |
| Ni | <0.2 | <0.2 | <0.2 | <0.2 |

EXAMPLES 9 AND 10

Suncor bitumen (Example 9) and Wabasca bitumen (Example 10) were ashed at 540° C. The ashes were mixed with sodium carbonate in the ratios shown in Table 4 and roasted, leached and analysed in the same manner as the previous Examples. As seen in the Table, the process of the invention yields high recovery of vanadium with low contamination for a wide range of solid materials derived from heavy oil and bitumen.

TABLE 4

VANADIUM RECOVERY FROM SUNCOR & WABASCA BITUMEN ASHES

| | Raw Material | | | | |
|---|---|---|---|---|---|
| | Suncor | Suncor | Wabasca | Wabasca | Wabasca |
| | Example or Comparison | | | | |
| | 9 | C9 | 10 | C10 | C11 |
| Temp., Deg. C. | 704 | — | 840 | 840 | — |
| Times Stoichiometric on Vanadium | 7.8 | (direct leach) | 1.43 | 1.86 | (direct leach) |
| Times Stoichiometric on Vanadium & Sulphur | 0.433 | (direct leach) | 0.211 | 0.2740 | (direct leach) |
| Raw Material/Salt Ratio | 10:3 | 0 | 10:1 | 10:1.3 | 0 |
| Vanadium Recovery (%) | 88.0 | — | 100.0 | 99.6 | — |
| Sulphur Recovery (%) | 14.4 | 100.0 | 93.8 | 94.4 | 98.7 |
| Contamination of Leach Solution, p.p.m. | | | | | |
| Ca | <0.1 | 1.8 | 7.2 | 14.9 | 98.0 |
| Al | <1.0 | <1.0 | <1.0 | <1.0 | 10.0 |
| Si | 4.5 | 1.5 | <1.0 | <1.0 | <1.0 |
| Fe | <0.2 | <0.2 | <0.2 | <0.2 | <0.2 |
| Ni | <0.2 | <0.2 | <0.2 | <0.2 | 9.2 |

Moreover, when carried out using cokes or ashes derived from cokes originating from any of several different sources, the process yields an overflow solution containing relatively small amounts of contaminants along with the desired vanadium values. Each Table shows the concentration of various contaminants found in the overflow solutions obtained from several sources and demonstrates the capability of the present process to give a high recovery of vanadium product with low contamination. Surprisingly, the levels of contaminants are well below the solubility products. Therefore, the contaminants are not precipitated during the vanadium recovery step using a properly chosen precipitating agent, for example an ammonium salt, and highly purified vanadium values are obtained without the necessity of a further purification step. All of the listed contaminants are found in the raw materials described in this disclosure.

The potential causes of contamination are several. One cause that may be encountered with some sources of raw material is the presence of soluble compounds in the raw material itself. This can normally be overcome in the vanadium precipitation or recovery step wherein the soluble contaminant does not co-precipitate with the vanadium compound. A second potential cause is the formation of soluble compounds other than alkali metal vanadate in the heating step. That this did not occur using the process of the invention is shown in each Table, in that low amounts of contaminants were found in the overflow solution. Only vanadium appears to be substantially solubilized by the process. A third potential source of contamination is excess reagent, and the impurities can appear in three ways: (a) the excess reagent itself can appear unchanged in the overflow solution, (b) the excess reagent in the overflow solution can encourage the solubilizing of other contaminants by ion exchange during leaching, or (c) the excess reagent in the overflow solution can render the overflow solution alkaline to the point where it can dissolve contaminating substances. With the raw materials used in the example, none of the above-described contaminating events took place. Further tests were carried out using raw materials that included Cold Lake ash (Canadian). In no case did contamination of the overflow solution occur provided reasonable care was taken to maintain the concentration of reagent within the scope of the invention. The minute amounts of reagent that did show in the overflow solution are not precipitated using conventional methods of recovering vanadium values, for example precipitating with ammonia.

What is claimed is:

1. A process for the recovery of vanadium from a sulphur-containing material of the group consisting of coke derived from hydrocarbonaceous oil and ash obtained from said coke, wherein said hydrocarbonaceous oil is heavy oil, in-situ oil sands bitumen or mineable oil sands bitumen, comprising:
   (a) mixing said material with an alkali metal carbonate reagent in a finely divided form,
   (b) heating the mixture in the presence of an oxidizing atmosphere at an elevated temperature below the fusion point of the reagent, (c) contacting the resulting solid residue and water to form a leach solution, and (d) recovering the vanadium values from the leach solution, wherein said material comprises vitrified materials and the amount of said alkali metal carbonate is at least twice the combined stoichiometric amount sufficient both to convert the vanadium values present in said material into alkali metal vanadate and to react with the sulphur present in said material, and insufficient to cause the substantial carryover of said alkali metal carbonate into said leach solution.

2. A process as claimed in claim 1, wherein the amount of said alkali metal carbonate is at least ten times the vanadium stoichiometric amount sufficient to convert the vanadium values present in said material into alkali metal vanadate.

3. A process as claimed in claim 2 wherein the amount of said alkali metal carbonate is at least fifteen times said vanadium stoichiometric amount.

4. A process as claimed in claim 1, wherein the amount of said alkali metal carbonate is at least three times said combined stoichiometric amount.

5. A process as claimed in claim 1, wherein said material is fly ash.

6. A process as claimed in claim 5, wherein said fly ash contains about 1.5 percent vanadium and 2.5 percent sulphur, and the amount of said alkali metal carbonate is at least three times said combined stoichiometric amount.

7. A process as claimed in claim 1 wherein said heating step is carried out at a temperature between 500° C. and 850° C.

8. A process as claimed in claim 1 wherein said mixture is heated for a time from 0.2 to 5 hours.

9. A process as claimed in claim 1 wherein said alkali metal carbonate is sodium carbonate.

* * * * *